United States Patent [19]
Garbarini et al.
[11] 3,748,410
[45] July 24, 1973

[54] TELEPHONE TRANSMITTER CUT-OFF

[76] Inventors: Morries P. Garbarini, 4941 Temple City Blvd., Temple City, Calif. 91780; Edmond A. Spera, 651 E. Laurel Ave., Glendora, Calif. 91740

[22] Filed: Apr. 2, 1971

[21] Appl. No.: 130,695

[52] U.S. Cl. .......... 179/167
[51] Int. Cl. .......... H04m 1/19
[58] Field of Search .......... 179/158, 167, 188

[56] References Cited
UNITED STATES PATENTS

| | | | |
|---|---|---|---|
| 3,504,138 | 3/1970 | Bottos | 179/167 |
| 3,588,387 | 6/1971 | Smith | 179/167 |
| 3,518,380 | 6/1970 | Brennan et al. | 179/167 |
| 2,838,615 | 6/1958 | Leifer | 179/167 |

*Primary Examiner*—William C. Cooper
*Attorney*—Lavine, Cantor & Reich

[57] ABSTRACT

A telephone handset transmitter has a cut-off switch located in the center of the transmitter cap for actuation by a finger of the hand holding the handset; a circuit to the transmitter microphone capsule is blocked by an insulating disc, which completes the circuit through the cut-off switch and related conductors.

7 Claims, 4 Drawing Figures

PATENTED JUL 24 1973

3,748,410

INVENTORS
MORRIES P. GARBARINI
EDMOND A. SPERA

Lavine, Cantor & Reich
ATTORNEYS

TELEPHONE TRANSMITTER CUT-OFF

BACKGROUND OF THE INVENTION

The present invention relates to a telephone handset transmitter with a cut-off in the nature of a switch to prevent transmission of sound through the transmitter.

It has long been recognized as being desirable to provide a telephone transmitter, that is, the portion of a telephone instrument including a microphone, to be rendered inactive during a telephone conversation. This need has arisen in order for the user of the telephone, for example, to speak to someone in the room where the user is located, without the person at the other end of the line being able to hear what the user is saying. Also, it is desirable to provide such a cut-off in order to eliminate the transmission of background noises from the user's location.

In the early prior art attempts to provide an apparatus for this purpose, it was recognized that merely cupping the hand of the user over the transmitter was not satisfactory, and a number of mechanical devices were proposed. In general, these provided a pair of adjacent perforated discs, with one disc being movable relative to the other so as to in one position provide for misalignment of the perforations in the discs, and in the other position to provide for alignment of the perforations in the discs, the position in which the perforations were mis-aligned being intended to preclude the transmission of sound from the user's mouth to the microphone of the transmitter. Such devices have been found to be impractical for a number of reasons, including the eventual wearing of the parts, necessitating their replacement in whole or in part. Hence, in later years, the art has developed other cut-off or obturating arrangements, and in particular has developed such arrangements which are electrical in their basic functioning.

Thus, in one suggestion, the perforated cap provided as a part of the handset, and covering the housing, the microphone capsule, was required to be twisted between positions providing for either a breaking of an electric circuit or the making of the electric circuit, the electric circuit including the microphone capsule. This proposal was found to be somewhat awkward to use, because it required the user to hold the handset with one hand and to rotate the cap with the other hand, thereby preventing the user from having one hand free for taking notes, etc. Another prior art proposal provided a transmitter cut-out requiring the manufacture of a replacement cap, having a space for a lever member which was actuable in an arc to effect circuit interruption, the actuable member engaging the transmitter or microphone capsule and having a knob located laterally of the cap. This suggestion was found to be deficient, for many reasons, including the reason that it did not provide for facile actuation of the knob of the actuable member or lever by both a left-handed and a right-handed user. That is to say, the knob was placed so that it could be readily used by a right-handed user, but was awkward or inaccessible for a left-handed user.

Still another proposal of the prior art provided a cut-out device which was threaded to the main portion of the handset, the mouthpiece cap being threaded to it; this cut-out device was operable by the user squeezing inwardly on a pair of arcuate strip members, which effected a short-circuiting of the connections to the transmitter unit or microphone capsule, thereby cutting it out. This proposal had the disadvantage that it substantially increased the dimensions of the transmitter portion of the handset, thereby rendering it awkward in appearance. In addition, this prior art proposal was somewhat complex and expensive to manufacture.

SUMMARY OF THE INVENTION

The present invention telephone transmitter cut-off provides a push button switch mounted in the transmitter cap, centrally thereof. The microphone capsule is housed within the cap, in its normal position, and, as conventional, has a pair of contacts on the bottom surface thereof. Beneath but spaced from the microphone capsule is a housing which partially encloses the capsule, and which has a pair of upstanding spring contact members. A cut-off circuit is provided, connecting these spring contact members with the contacts of the microphone capsule, including the above noted switch. Specifically, an insulating disc is provided below the microphone capsule, having an annular conductor on the upper surface thereof with an outstanding tab, and a similar conductor on the lower surface thereof. The tabs of these conductors each engages with one of a pair of conducting strips, these conducting strips being connected with the noted switch. The insulating disc has centrally thereof an axially extending conductor member which serves to connect one of the microphone capsule contacts directly with one of the spring contact members. The other spring contact members engages the conductor on the bottom of the insulating disc, and a circuit extends therefrom through one of the conducting strips, to the switch, to the other conducting strip, to the other conductor on the insulating disc, and thence to the other of the contacts of the microphone capsule.

Among the objects of the present invention are to provide a telephone handset transmitter cut-off which is conveniently placed so that it may be operated by a finger of the hand holding the handset, whether the user be left-handed or right-handed. Another object of the present invention is to provide a transmitter cut-off having relatively few parts, which is easily fabricated, and which is extremely economical. A further object of the present invention is to provide a transmitter cut-off which is reliable in operation, and is capable of being used over a long period of time and for many operations of the cut-off. A still further object of the present invention is to provide a transmitter cut-off which does not alter the outward appearance of the handset, other than by providing a small push button switch centrally of the transmitter cap.

DESCRIPTION OF THE PREFERRED EMBODIMENT

Figures 1, 3, 4:
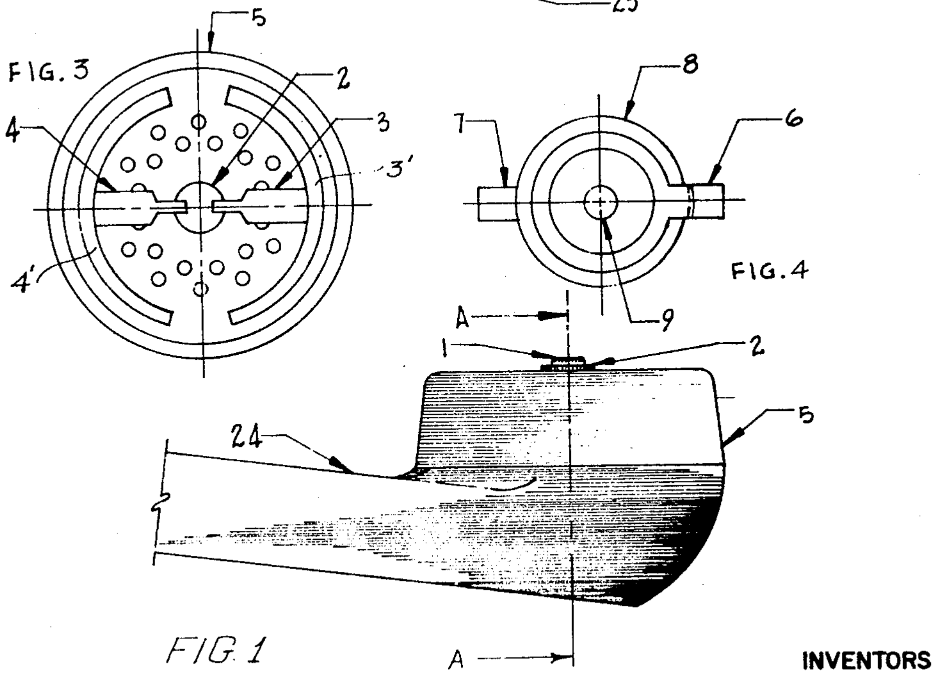
FIG. 1 is an elevational view of a portion of a telephone handset provided with the transmitter cut-off of the present invention.
FIG. 3 is a view taken on line B—B of FIG. 2.
FIG. 4 is a view taken on line C—C of FIG. 2.

Referring now to the drawings, wherein like or corresponding reference numerals are used to designate like or corresponding parts throughout the several views, there is shown in FIG. 1 the transmitter portion of a conventional telephone handset, including handle portion 24 having a transmitter cap 5 thereon. Cap 5 is cupshaped and comprises a central disc portion and a depending annular skirt portion. On the cap 5, and extending centrally and axially thereof, there may be seen a push button 1 which is the operating member of a switch, generally designally designated 2.

Figure 2:
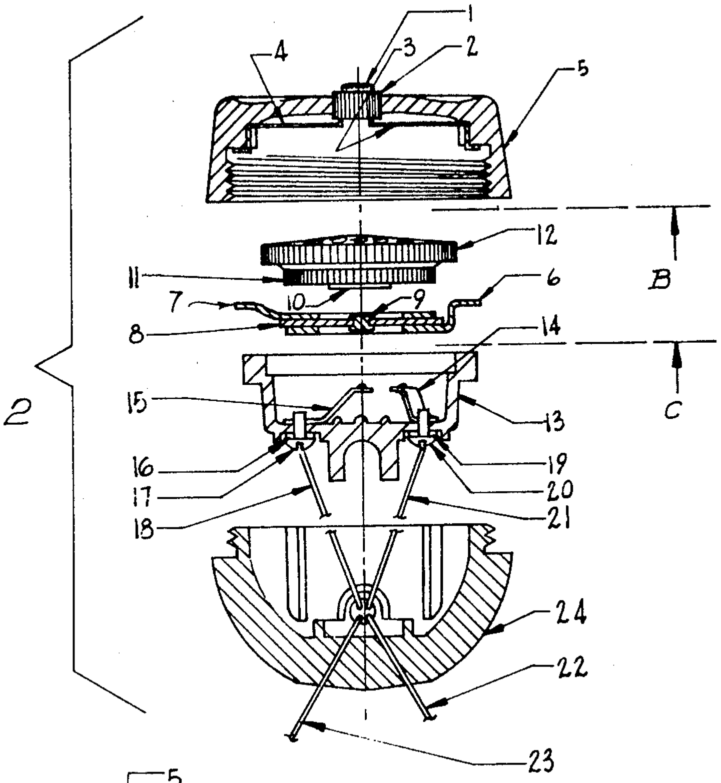
FIG. 2 is an exploded view, with parts in section, taken on the line A—A of FIG. 1.

Referring now to FIG. 2, the transmitter cap 5 may be seen to have internal threads at its lower end, and to have the switch 2 mounted centrally and axially thereof, together with the push button operator 1. Switch 2 is preferably a well known and commercially available switch, which, upon depressing the push button 1, will effect circuit interruption.

On subsequent depressing of the push button 1, the switch will be closed, and the circuit completed therethrough.

As is best seen in FIG. 3, the centrally mounted switch 2 has a pair of conducting strips 3 and 4 extending outwardly, and including arcuately extending tabs 3′ and 4′, for effecting, in a facile manner, contact with members described hereinbelow.

An insulating disc 8 is provided having extending centrally and axially thereof an elongate conductor member 9. Referring to FIG. 4, on the bottom surface of the insulating disc 8 is an annular conductor 6, which includes an outwardly extending tab. On the upper surface of the insulating disc, as shown in FIG. 2, is a similar annular conductor 7 with outwardly extending tab. In assembled relationship, the tab of the annular conductor 7 will make contact with the arcuate tab 4′ of the conducting strip 4, and the tab of the annular conductor 6 will similarly make contact with the arcuate tab 3′ of the conducting strip 3, or alternately, the opposite tabs will be engaged. In addition, the upper end of the elongate conductor member 9 will engage with the under side of a contact 10, centrally located on the under side of a microphone capsule 12, and the annular conductor 7 will engage an annular contact 11, also on the under side of the microphone capsule 12.

Housed within the handle 24 of the handset, in conventional manner, is a cup 13 of insulating material having a pair of spring contact members 14 and 15, the latter having a contact end located on the axis of the transmitter, and normally engaging the contact 10, but in the present invention apparatus engaging the lower end of the elongate conductor member 9. The end of the spring contact member 14 engages the annular conductor 6. Spring contact member 15 is secured to the cup 13 by a screw 17, having a terminal clip 16 between the head thereof and a portion of the cup 13; terminal clip 16 is connected, in normal manner, to a wire 18. Similarly, spring contact member 14 is secured to cup 13 by a screw 20, having a terminal clip 19 beneath the head thereof, a wire 21 being connected to the terminal clip 19. The wires 18 and 21 are connected in normal manner to other circuitry, not forming a part of the present invention, and generally and diagrammatically indicated by the wires 22 and 23.

It will be understood that a circuit will extend from wire 21 to the spring contact member 14, and thence to the annular conductor 6, the tab of which will be in engagement with the arcuate tab 3′ of the conducting strip 3. Thence, the circuit will pass through the switch 2, or be interrupted at the switch 2, and will pass thence through the conducting strip 4, the arcuate tab 4′ thereof, and to the tab of the annular conductor 7, and to the contact 11 of the microphone capsule 12. The circuit will then pass through the microphone capsule to the central contact 10 thereof, and thence through the elongate conductor member 9 in the insulating disc 8, to the spring contact member 15, and thence to the wire 18.

The present invention telephone transmitter cut-off will be seen to comprise only a few parts, specifically the insulating disc 8, with its associated parts, and the switch 2, together with the conducting strips associated with it. Only minor modification of the conventional telephone handset is required, this being by the provision of a suitable hole through the transmitter cap, to receive the switch 2. Hence, the present invention telephone transmitter cut-off is of a few parts which are economical and which may be conveniently and economically fabricated. The outward appearance, and particularly the height, of the transmitter portion of the telephone handset is not changed, the only change in appearance being due to the small switch and push button associated with it.

In use, it is extremely convenient for a user to manipulate the switch, by pressing on the push button with a finger of the hand holding the handset, and this may be accomplished whether the user is left-handed or right-handed. In either case, the user's other hand is free for note taking and the like.

The present invention cut-off is long lasting, since the only moving part thereof is the switch, and such switches are readily available, are economical, and have been proven to be operable over thousands of operations, without failure.

It will be obvious to those skilled in the art that various changes may be made without departing from the spirit of the invention and therefore the invention is not limited to what is shown in the drawings and described in the specification but only as indicated in the appended claims.

We claim:

1. A telephone transmitter cut-off comprising:
a telephone handset including a housing including a cup-shaped transmitter cap, said cap having a disc portion and an annular skirt portion, said housing having a microphone capsule therein, said capsule having a pair of contacts thereon,
a pair of contact members in said housing in juxtaposition with said pair of contacts, means for connecting one said member with one said contact,
and circuit means connecting said other contact member with said other contact and including switch means positioned in said disc portion of said cap.

2. The apparatus of claim 1, wherein said switch means comprises a push button switch extending centrally of the disc portion of said cap.

3. The apparatus of claim 2, said circuit means comprising a pair of conducting strips extending from said switch interiorly of said cap and outwardly of said switch.

4. The apparatus of claim 3, said circuit means further comprising a pair of conductor means each insulated from the other and each engaging a said conducting strip, one said conductor means engaging a said contact and the other said conductor means engaging a said contact member.

5. The apparatus of claim 4, and further including an insulating disc, one said conductor means being mounted on either side of said insulating disc.

6. The apparatus of claim 5, said insulating disc having an elongate conductor member extending therethrough and spaced from said conductor means, said conductor member engaging said other contact and said other contact member.

7. The apparatus of claim 1, and further comprising an insulating disc, said means connecting said one contact member with said one contact comprising a conductor member extending through said disc.

* * * * *